United States Patent
Yee et al.

(10) Patent No.: US 9,735,687 B2
(45) Date of Patent: Aug. 15, 2017

(54) REGULATING POWER CONVERTER BY SENSING TRANSFORMER DISCHARGE TIMING

(71) Applicant: SYNC POWER CORP., Taipei (TW)

(72) Inventors: Hsian-Pei Yee, Taipei (TW); Ya-Wu Chong, Taipei (TW); Yung-Ho Tan, Taipei (TW)

(73) Assignee: Sync Power Corp., Taipei (TW)

( * ) Notice: Subject to any disclaimer, the term of this patent is extended or adjusted under 35 U.S.C. 154(b) by 15 days.

(21) Appl. No.: 14/948,940

(22) Filed: Nov. 23, 2015

(65) Prior Publication Data

US 2017/0149338 A1 May 25, 2017

(51) Int. Cl.
*H02M 3/335* (2006.01)

(52) U.S. Cl.
CPC .............................. *H02M 3/33507* (2013.01)

(58) Field of Classification Search
CPC ......... H02M 3/33507; H02M 3/33553; H02M 3/335; H02M 3/33523; H02M 2001/0032; H02M 3/156; H02M 1/32; H02M 3/3385; H02M 3/18; H02M 3/07; H02M 2001/322; Y02B 70/1433; Y02B 70/1475; Y02B 70/16; H02J 7/00
USPC .......................................... 363/21.12–21.18
See application file for complete search history.

(56) References Cited

U.S. PATENT DOCUMENTS

| | | | | |
|---|---|---|---|---|
| 6,842,350 B2* | 1/2005 | Yamada | ................ | H02M 3/335 363/21.12 |
| 6,977,824 B1* | 12/2005 | Yang | ................ | H02M 3/33507 363/21.16 |
| 7,259,972 B2* | 8/2007 | Yang | ................ | H02M 3/33507 363/21.13 |
| 7,388,764 B2* | 6/2008 | Huynh | .............. | H02M 3/33523 363/21.12 |
| 7,859,862 B2* | 12/2010 | Lin | ................... | H02M 3/33523 363/21.12 |
| 7,961,483 B2* | 6/2011 | Huynh | .............. | H02M 3/33507 363/21.12 |
| 7,978,558 B2* | 7/2011 | Kunst | .............. | G01R 31/31703 365/201 |
| 8,125,799 B2* | 2/2012 | Zhu | ................... | H02M 3/33523 363/21.12 |
| 8,300,433 B2* | 10/2012 | Chang | ............... | H02M 3/33523 363/21.16 |
| 8,441,813 B2* | 5/2013 | Tan | ....................... | H02M 3/338 363/21.03 |

(Continued)

OTHER PUBLICATIONS

Received search report from STIC EIC 2800 searcher Benjamin Martin on Dec. 14, 2016.*

*Primary Examiner* — Timothy J Dole
*Assistant Examiner* — Htet Z Kyaw
(74) *Attorney, Agent, or Firm* — Muncy, Geissler, Olds & Lowe, P.C.

(57) ABSTRACT

A regulating power converter has a transformer, a charging circuit and a discharging circuit connected with each other. The charging circuit charges said transformer whereby the transformer generates a secondary voltage. The discharging circuit discharges the secondary voltage to generate an output voltage. The charging circuit retrieves time information from the secondary voltage through the transformer. The charging circuit drives the transformer to regulate the output voltage according to the time information.

10 Claims, 4 Drawing Sheets

(56) References Cited

U.S. PATENT DOCUMENTS

| | | | | |
|---|---|---|---|---|
| 8,493,752 B2* | 7/2013 | Lin | ............... | H02M 1/44 |
| | | | | 363/21.13 |
| 8,659,915 B2* | 2/2014 | Tsui | ............... | H02M 3/33523 |
| | | | | 363/21.02 |
| 8,811,045 B2* | 8/2014 | Ren | ............... | H02M 3/33507 |
| | | | | 363/21.12 |
| 2006/0034102 A1* | 2/2006 | Yang | ............... | H02M 3/33507 |
| | | | | 363/21.13 |
| 2008/0007982 A1* | 1/2008 | Piper | ............... | H02M 3/33523 |
| | | | | 363/97 |
| 2009/0262561 A1* | 10/2009 | Mayell | ............... | H02M 3/3385 |
| | | | | 363/21.12 |
| 2010/0085781 A1* | 4/2010 | Saji | ............... | H02M 3/33523 |
| | | | | 363/21.16 |
| 2010/0157636 A1* | 6/2010 | Li | ............... | H02M 3/33515 |
| | | | | 363/124 |
| 2010/0164455 A1* | 7/2010 | Li | ............... | H02M 3/157 |
| | | | | 323/283 |
| 2011/0228571 A1* | 9/2011 | Lin | ............... | H02M 1/44 |
| | | | | 363/21.16 |
| 2013/0148387 A1* | 6/2013 | Ren | ............... | H02M 1/36 |
| | | | | 363/21.16 |
| 2014/0268913 A1* | 9/2014 | Zheng | ............... | H02M 7/2176 |
| | | | | 363/21.13 |
| 2015/0334800 A1* | 11/2015 | Fawaz | ............... | H05B 33/0812 |
| | | | | 315/294 |
| 2016/0020703 A1* | 1/2016 | Gong | ............... | H02M 3/33592 |
| | | | | 363/21.14 |
| 2016/0226239 A1* | 8/2016 | Yang | ............... | H02M 1/32 |

* cited by examiner

US 9,735,687 B2

REGULATING POWER CONVERTER BY SENSING TRANSFORMER DISCHARGE TIMING

BACKGROUND OF THE INVENTION

Field of the Invention

The present invention relates to a conversion device, particularly to a regulating power converter by sensing the transformer discharge timing.

Description of the Related Art

Due to the fact that internal elements of most electric devices require direct-current (DC) voltages, a power supply is used to convert alternating-current (AC) voltages or DC voltage into the DC voltages such that the electric device operate well. The power supply is divided into nonisolated power supplies and isolated switching power supplies. Isolated power supplier, with an inclusion of a power transformer, is used for most AC to DC, and some DC to DC converters, for safety and other performance considerations. There are various topologies for such converters; examples of such isolated converters topologies including Flyback, Forward, Qusai-Resonant, Full Bridge, Half-Bridge and Push-Pull.

In order to precisely control the output voltage, the isolated converter uses primary side regulation (PSR) or secondary side regulation (SSR) to send information from the secondary side back to the primary side. In SSR, a photo-coupler is often used to serve the purpose. However, the photo-coupler is very expensive. For PSR, the photo-coupler is eliminated. FIG. 1 shows an isolated converter with PSR, and FIG. 2 shows waveforms of voltage and current of the isolated converter with PSR. As shown in FIG. 1 and FIG. 2, the isolated converter comprises a transformer 10, an NMOSFET 12, a resistor 14, a controller 16 and a diode 18. The transformer 10 has a primary winding, a secondary winding and an auxiliary winding. A primary voltage Vp, a secondary voltage Vs and an auxiliary voltage Va are respectively applied across the primary winding, the secondary winding and the auxiliary winding. The primary winding is connected with a voltage terminal having an input voltage Vin and receives a primary current Ip from the voltage terminal. The secondary winding sends out a secondary current Is to a loading capacitor 20 via the diode 18. The NMOSFET 12 receives a gate voltage Vg from the controller 16. An output voltage Vo is applied across the loading capacitor 20.

PSR has a key advantage of providing regulation without secondary side sensing, thus simplifies the power supply by removing secondary output voltage sensing and feedback through the isolation. Instead, the output voltage sensing takes places on the auxiliary winding on the primary side. In traditional PSR design, voltage sensing on the auxiliary winding suffers from its dependency on the accuracy of transformer ratios, since the output voltage Vo is related to PSR sensed voltage Va by the winding ratio of auxiliary winding to the secondary winding. One turn of winding is 360 degrees around the transformer core. During transformer manufacture, a winding ratio error is produced when an actual turn is slightly more or less than a designed one. The winding errors introduced by the first winding and last winding are higher than the middle windings.

The primary winding has a relatively higher number of turns. Since the major winding error only involves the first and last winding, the percent winding error is relatively small. The auxiliary winding has a much smaller number of windings, thus winding error is much more significant. This becomes a critical problem in traditional PSR converters, where the Vo is sensed at the auxiliary winding. The winding ratio of Nerr:1 and Merr:1 is respectively for primary:secondary and auxiliary:secondary. For the next cycle voltage control, the traditional way is to detect the voltage S1/S2/S3 of the auxiliary winding in voltage sampling mode. But the problem of its existing method is the accuracy of the voltage sampling points. If the voltage sampling point is caught too early, such as S1, the secondary measure is too large, and the voltage across the diode 18 will be too large, which causes sampling voltage too large. If the voltage sampling point is caught too late, such as S3, the wrong ring voltage is sampled. Therefore, how to catch the exact point in voltage sampling mode, such as S2 is critical. However, in any case, the error inductance produced Men cannot be changed in voltage sampling mode.

To overcome the abovementioned problems, the present invention provides a regulating power converter by sensing the transformer discharge timing, so as to solve the aforementioned problems of the prior art.

SUMMARY OF THE INVENTION

A primary objective of the present invention is to provide a regulating power converter, which retrieves time information from the secondary voltage at the secondary side through the transformer, and which uses the time information to regulate the output voltage at the secondary side without being affected by the winding ratio error.

To achieve the abovementioned objectives, the present invention provides a regulating power converter, which comprises a transformer, a charging circuit and a discharging circuit connected with each other. The charging circuit charges said transformer whereby the transformer generates a secondary voltage. The discharging circuit discharges the secondary voltage to generate an output voltage. The charging circuit retrieves time information from the secondary voltage through the transformer. The charging circuit drives the transformer to regulate the output voltage according to the time information.

Below, the embodiments are described in detail in cooperation with the drawings to make easily understood the technical contents, characteristics and accomplishments of the present invention.

DETAILED DESCRIPTION OF THE INVENTION

Figure 1:
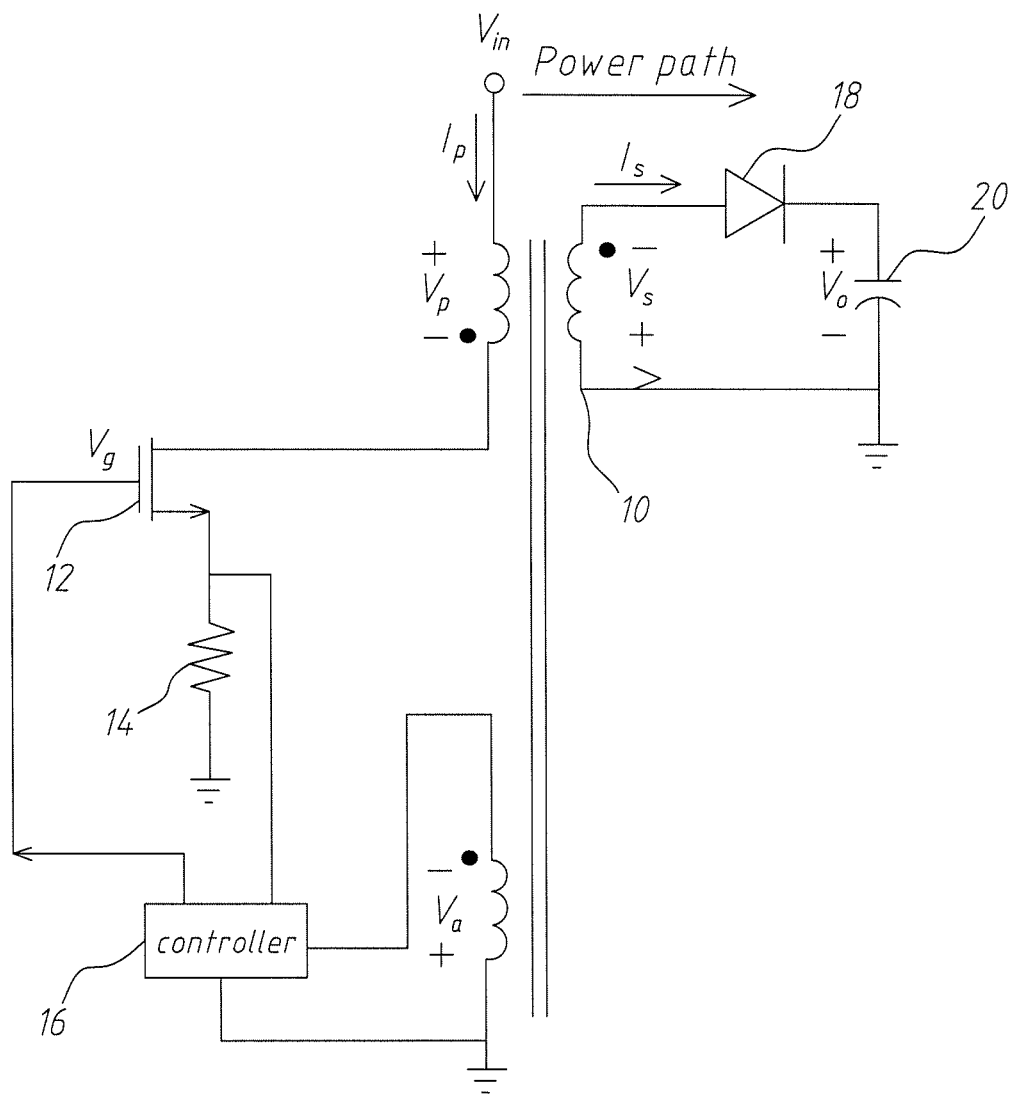
FIG. 1 is a schematic diagram illustrating an isolated converter with primary side regulation (PSR) of the prior art.
Figure 2:
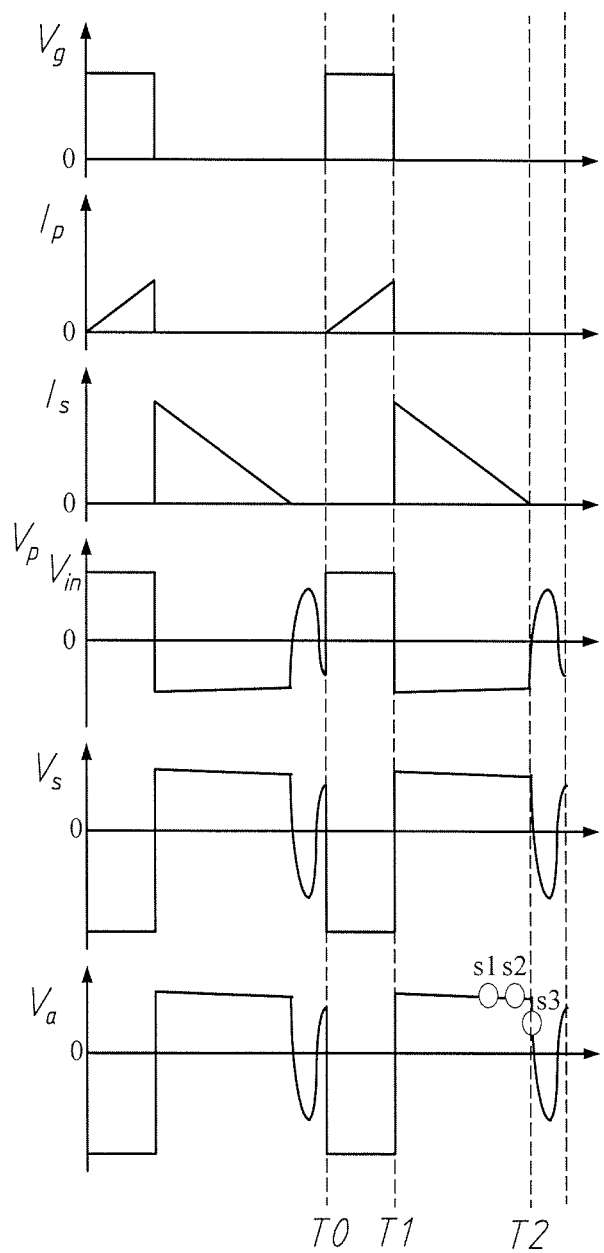
FIG. 2 is a diagram illustrating voltage waveforms and current waveforms in the converter of FIG. 1.
Figure 3:
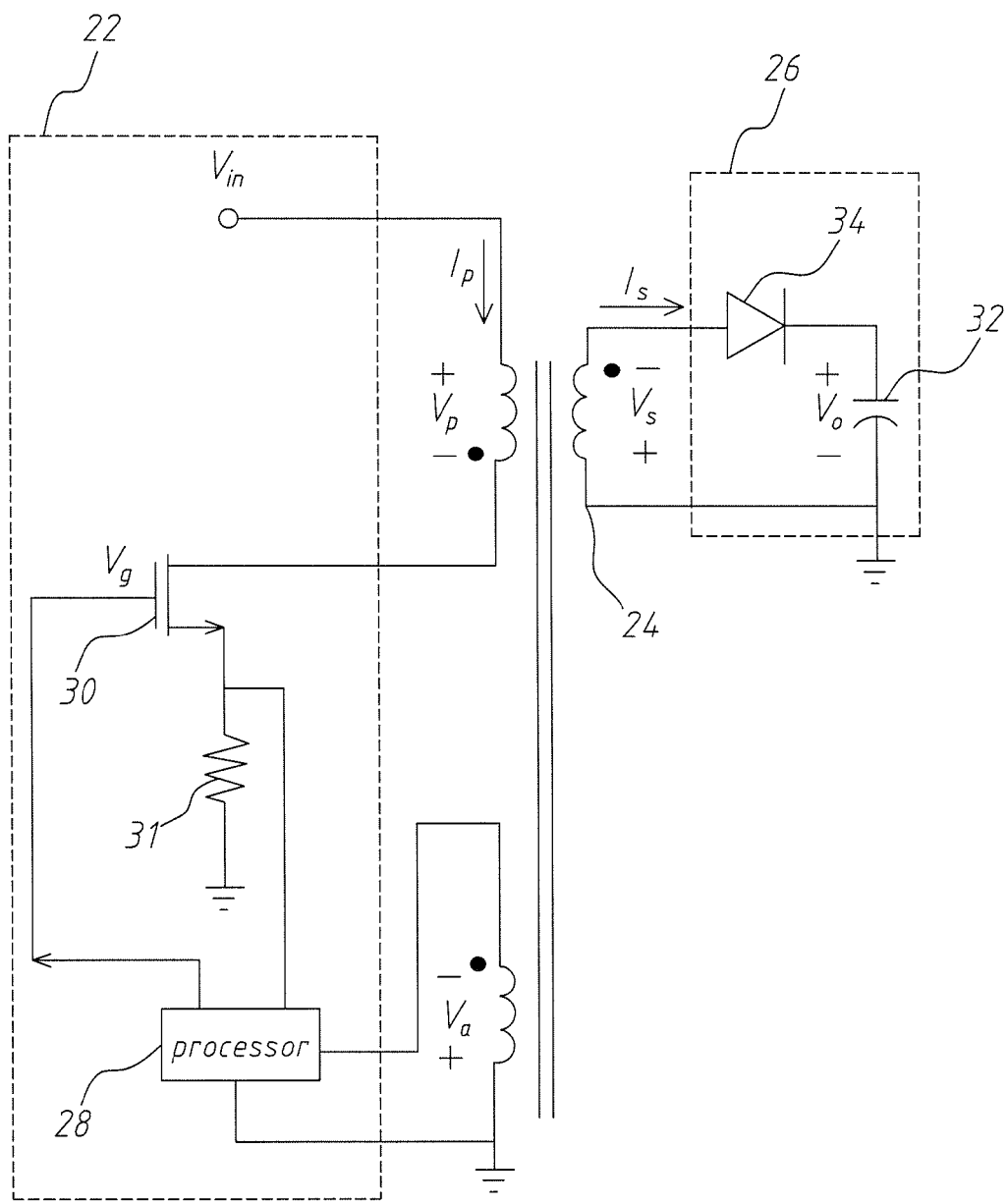
FIG. 3 is a schematic diagram illustrating a regulating power converter according to an embodiment of the present invention.
Figure 4:
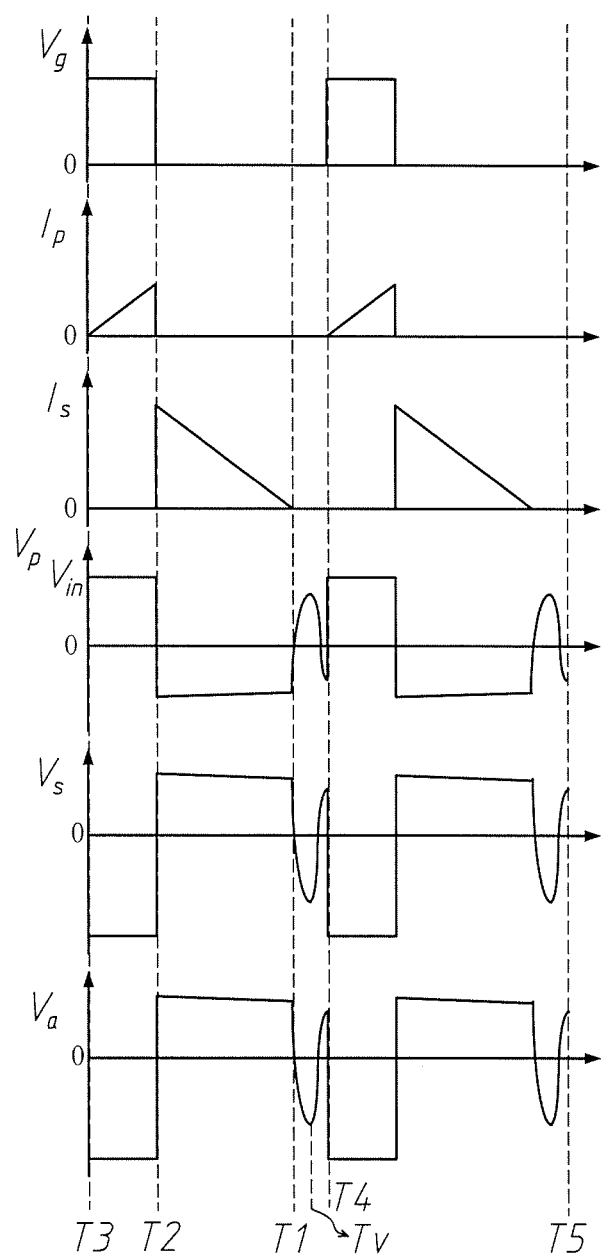
FIG. 4 is a diagram illustrating voltage waveforms and current waveforms in the power supply of FIG. 3.

Refer to FIG. 3 and FIG. 4. The regulating power converter of the present invention comprises a charging circuit 22, a transformer 24 and a discharging circuit 26. The charging circuit 22 connects with the transformer 24 and charges the transformer 24 whereby the transformer 24 generates a secondary voltage Vs. The discharging circuit 26 connects with the transformer 24, and discharges the secondary voltage Vs to generate an output voltage Vo and a secondary current Is. The charging circuit 22 retrieves time information from the secondary voltage Vs through the transformer 24. The charging circuit 22 drives the transformer 24 to regulate the output voltage Vo according to the time information. In an embodiment, the time information, for example, but not limited to a first time point T1 that the secondary current Is becomes zero after a second time point T2 that the discharging circuit 26 starts to generate the secondary current Is, is adopted. Besides, a time duration between the first and second time points T1 and T2 is fixed.

Specifically, the transformer 24 has a primary winding, a secondary winding and an auxiliary winding, and the discharging circuit 26 is connected with the secondary winding, and the primary winding is connected with a voltage terminal. The voltage terminal has an input voltage Vin. The charging circuit 22 further comprises a processor 28, an electrical switch 30 and a resistor 31, wherein the electrical switch 30 is realized with an N-channel metal oxide semiconductor field effect transistor (NMOSFET) or a P-channel metal oxide semiconductor field effect transistor (PMOSFET). The processor 28 is connected with the auxiliary winding, generates a control signal whose voltage is Vg, and presets the input voltage Vin and N which is a winding ratio of the primary winding to the secondary winding. A winding ratio of the auxiliary winding to the secondary winding is M, and N is larger than M. The control signal is a digital signal with two voltage levels. The electrical switch 30 is connected with the processor 28 and the primary winding and receives the control signal to switch an on state and an off state thereof. The electrical switch 30 is grounded via the resistor 31. The transformer 24 is charged by the input voltage Vin in on state of the electrical switch 30 whereby the secondary voltage Vs and a sensed signal whose voltage is Va are respectively generated across the secondary winding and the auxiliary winding. Then, the discharging circuit 26 discharges the secondary voltage Vs to generate the output voltage Vo and the secondary current Is in off state of the electrical switch 30. Simultaneously, the processor 28 receives the sensed signal, and the processor 28 uses a preset parameter to detect the sensed signal after the second time point T2, so as to obtain the first time point T1. The processor 28 updates the control signal to regulate the output voltage Vo according to a relationship comprising the first time point T1, the control signal, N and the input voltage Vin, such as [Vin×(T2−T3)]/[N×(T1−T2)], wherein T3 is a third time point that the control signal starts to turn on the electrical switch 30, and T2 is also a time point that the control signal starts to turn off the electrical switch 30. The relationship is derived from Formulas (1)-(8) based on input energy equal to output energy over time:

$$V_p = L_p \frac{di}{dt} \quad (1)$$

$$V\mathrm{in} \times (T2 - T3) = L_p \times Ip \quad (2)$$

$$V_s = L_s \frac{di}{dt} \quad (3)$$

$$Vs \times (T1 - T2) = L_s \times Is \quad (4)$$

$$\frac{V\mathrm{in} \times (T2 - T3)}{Vs \times (T1 - T2)} = \frac{L_p \times Ip}{L_s \times Is} \quad (5)$$

$$\frac{L_p}{L_s} = \frac{Is^2}{Ip^2} \quad (6)$$

$$\frac{V\mathrm{in} \times (T2 - T3)}{Vs \times (T1 - T2)} = \frac{Is}{Ip} = N \quad (7)$$

$$\frac{V\mathrm{in} \times (T2 - T3)}{N} = Vs \times (T1 - T2) \quad (8)$$

$L_p$ is an inductance of the primary winding, and $L_s$ is an inductance of the secondary winding, and i means current, and t means time, and Ip is a primary current of the primary winding, and Vp is a primary voltage across the primary winding. Formula (1) and Formula (3) are respectively an input inductance-voltage formula and an output inductance-voltage formula. Formula (2) is obtained from Formula (1), and Formula (4) is obtained from Formula (3). Formula (5) is obtained from Formula (2) divided by Formula (4). Formula (6) is obtained based on input energy equal to output energy over time. Incorporating Formula (6) into Formula (5) leads to Formula (7). Formula (8) is obtained after transposing Formula (7). When the secondary current becomes zero, Vs equals to Vo. As a result, [Vin×(T2−T3)]/[N×(T1−T2)]=Vo is obtained from Formula (8), so as to regulate the output voltage without being affected by the winding ratio error of the auxiliary winding.

In addition, when the secondary current Is starts to become zero, the sensed signal is a resonant signal which starts to be generated across the auxiliary winding. In order to obtain the timing closest to a start time point of the resonant signal, the first time point T1 generally exists between the start time point of the resonant signal and a valley time point Tv corresponding to a valley voltage of the resonant signal, and the valley time point Tv is closest to the start time point. Alternatively, the first time point T1 generally exists between a start time point of the resonant signal and a peak time point corresponding to a peak voltage of the resonant signal, and the peak time point is closest to the start time point. In this embodiment, take the first time point T1 existing between the start time point of the resonant signal and the valley time point Tv for example. The preset parameter of the processor 28 is a preset voltage or a preset slope related to the resonant signal. After the second time point T2, the processor 28 obtains a first sensed time point that the voltage Va of the sensed signal firstly reaches the preset voltage, and the first sensed time point is used as the first time point T1. Alternatively, after the second time point T2, the processor 28 obtains a second sensed time point that the sensed signal firstly reaches the preset slope, and the second sensed time point is used as the first time point T1.

The discharging circuit 26 further comprises a loading capacitor 32 and a diode 34. The loading capacitor 32 is connected with the secondary winding, and the diode 34 is connected between the secondary winding and the loading capacitor 32. The secondary winding sends out the secondary current Is to the loading capacitor 32 via the diode 34 whereby the output voltage Vo is applied across the loading capacitor 32.

The operation of the regulating power converter of the present invention is described below. Firstly, during a period between T2 and T3, the control signal whose voltage Vg is a high level turns on the electrical switch 30 whereby the transformer 24 receives the input voltage Vin and the primary current Ip and uses them generate the primary voltage Vp, the secondary voltage Vs and the sensed signal. After T2, the control signal whose voltage Vg is a low level starts to turn off the electrical switch 24 whereby the secondary winding sends out the secondary current Is to the loading capacitor 32 via the diode 34 whereby the output voltage Vo is applied across the loading capacitor 32. Meanwhile, the processor 28 receives the sensed signal and uses the preset parameter to detect the sensed signal to obtain the first time point T1 that the secondary current Is becomes zero. In this case, the first time point T1 exists between the start time point of the resonant signal across the auxiliary winding and the valley time point Tv of the resonant signal, and the valley time point Tv is closest to the start time point. Consequently, the processor 28 updates the control signal between T3 and T4 to regulate the output voltage Vo according to the relationship of [Vin×(T2−T3)]/[N×(T1−T2)]. The updated control signal is shown between T4 and T5. T4 is the time point that the updated control signal whose voltage is a high level starts. T5 is the time point that the updated control signal whose voltage is a low level ends.

In conclusion, the present invention obtains the first time point that the secondary current becomes zero after starting to turn off the electrical switch, and uses the first time point to regulate the output voltage without the winding ratio error of the auxiliary winding.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A regulating power converter comprising:
    a transformer;
    a charging circuit connecting with said transformer, and charging said transformer whereby said transformer generates a secondary voltage;
    a discharging circuit connecting with said transformer, and discharging said secondary voltage to generate an output voltage and a secondary current, and said charging circuit retrieves time information from said secondary voltage through said transformer, and said charging circuit drives said transformer to regulate said output voltage according to said time information, and said time information is a first time point that said secondary current becomes zero after a second time point that said discharging circuit starts to generate said secondary current, and a time duration between said first and second time points is fixed, and said transformer has a primary winding, a secondary winding and an auxiliary winding, and said discharging circuit is connected with said secondary winding, and said primary winding is connected with a voltage terminal, and said discharging circuit further comprises a loading capacitor connected with said secondary winding, and said secondary current is sent to said loading capacitor whereby said output voltage is applied across said loading capacitor, and said charging circuit further comprises:
        a processor connected with said auxiliary winding, generating a control signal, and presetting N which is a winding ratio of said primary winding to said secondary winding, and said voltage terminal has an input voltage preset by said processor; and
        an electrical switch connected with said processor and said primary winding and receiving said control signal to switch an on state and an off state thereof, said transformer is charged by said input voltage in said on state whereby said secondary voltage and a sensed signal are respectively generated across said secondary winding and said auxiliary winding, and then said discharging circuit discharges said secondary voltage to generate said output voltage and said secondary current in said off state, said processor receives said sensed signal, and said processor uses a preset parameter to detect said sensed signal after said second time point, so as to obtain said first time point, and said processor updates said control signal to regulate said output voltage according to said first time point, said control signal, N and said input voltage, and said processor updates said control signal according to [Vin×(T2−T3)]/[N×(T1−T2)], and T1 is said first time point, and T3 is a third time point that said control signal starts to turn on said electrical switch, and T2 is said second time point, and Vin is said input voltage.

2. The regulating power converter of claim 1, wherein said charging circuit converts said time information into voltage information, and said charging circuit drives said transformer to regulate said output voltage according to said voltage information.

3. The regulating power converter of claim 1, wherein said preset parameter is a preset voltage, and after said second time point, said processor obtains a first sensed time point that said voltage of said sensed signal firstly reaches said preset voltage, and said first sensed time point is used as said first time point.

4. The regulating power converter of claim 1, wherein said preset parameter is a preset slope, and after said second time point, said processor obtains a second sensed time point that said sensed signal firstly reaches said preset slope, and said second sensed time point is used as said first time point.

5. The regulating power converter of claim 1, wherein when said secondary current starts to become zero, said sensed signal is a resonant signal which starts to be generated across said auxiliary winding, and said first time point exists between a start time point of said resonant signal and a valley time point corresponding to a valley voltage of said resonant signal, and said valley time point is closest to said start time point.

6. The regulating power converter of claim 1, wherein when said secondary current starts to become zero, said sensed signal is a resonant signal which starts to be generated across said auxiliary winding, and said first time point exists between a start time point of said resonant signal and a peak time point corresponding to a peak voltage of said resonant signal, and said peak time point is closest to said start time point.

7. The regulating power converter of claim 1, wherein said electrical switch is an N-channel metal oxide semiconductor field effect transistor (NMOSFET) or a P-channel metal oxide semiconductor field effect transistor (PMOSFET).

8. The regulating power converter of claim 1, wherein said control signal is a digital signal with two voltage levels.

9. The regulating power converter of claim 1, wherein said discharging circuit further comprises a diode connected between said secondary winding and said loading capacitor, and said secondary winding sends out said secondary current to said loading capacitor via said diode.

10. The regulating power converter of claim 1, wherein a winding ratio of said auxiliary winding to said secondary winding is M, and N is larger than M.

* * * * *